May 17, 1932.  F. J. HINDERLITER  1,858,501
APPARATUS FOR CEMENTING WELL CASINGS
Filed Sept. 25, 1929   2 Sheets-Sheet 1
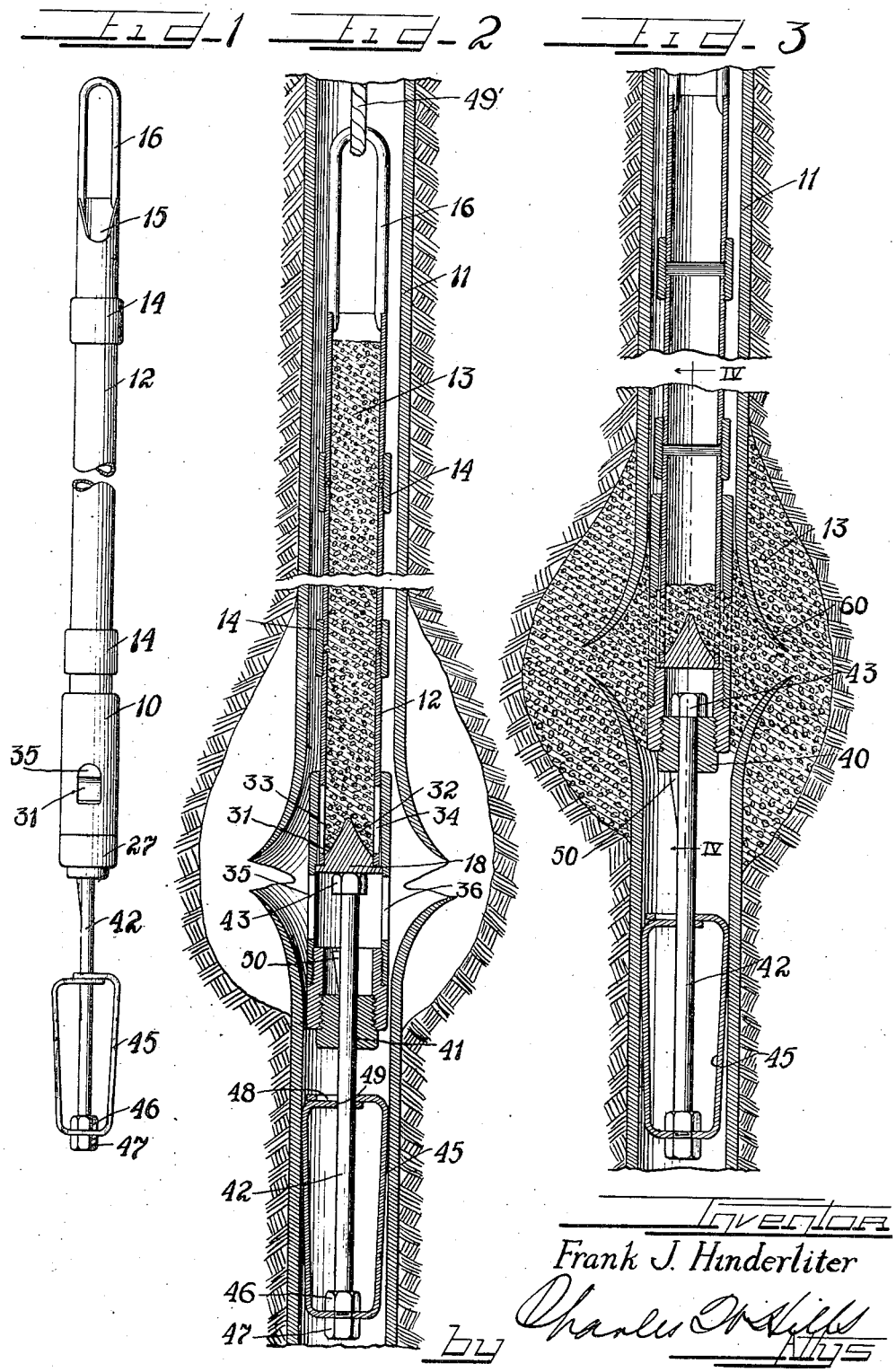
Inventor
Frank J. Hinderliter

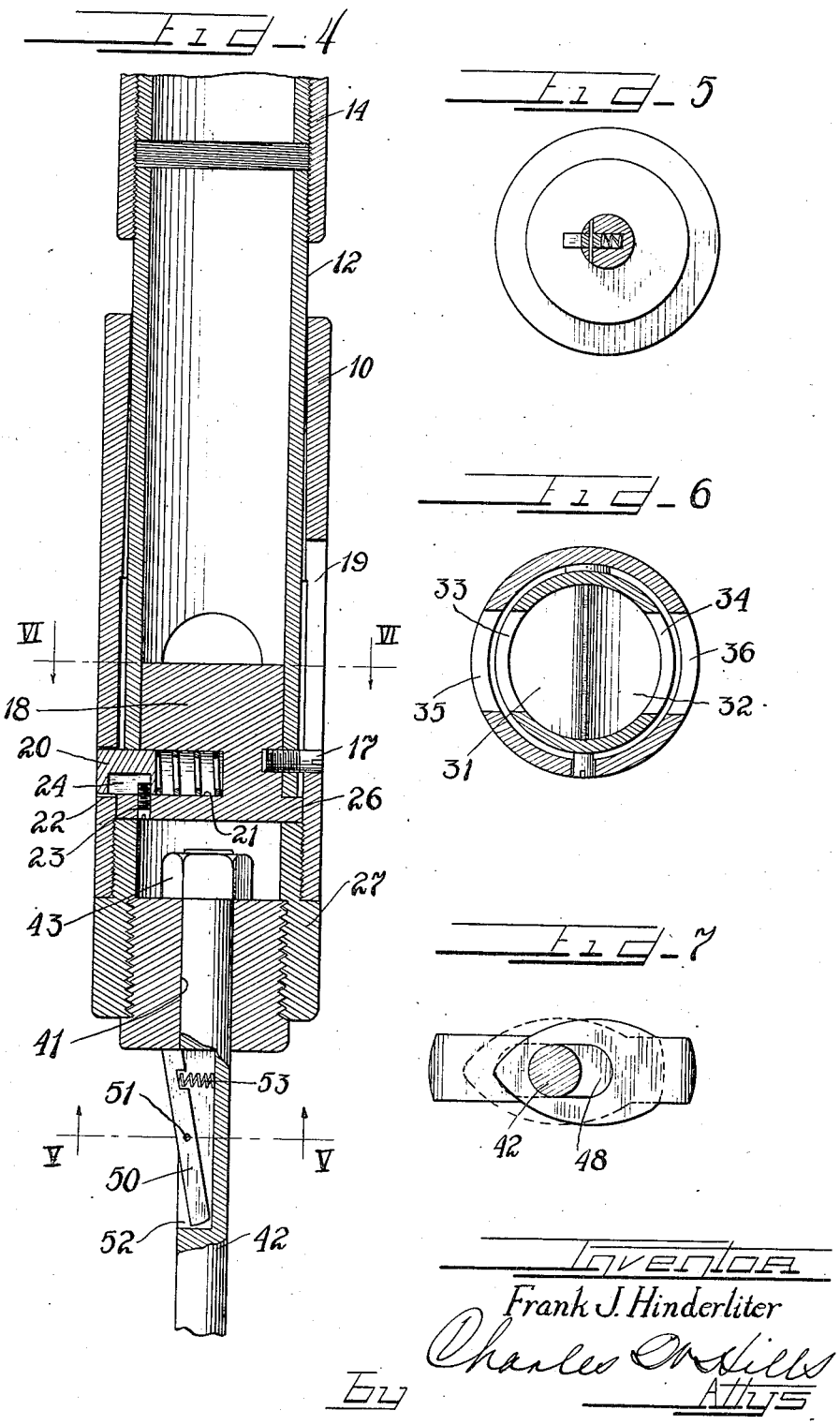

Patented May 17, 1932

1,858,501

UNITED STATES PATENT OFFICE

FRANK J. HINDERLITER, OF TULSA, OKLAHOMA

APPARATUS FOR CEMENTING WELL CASINGS

Application filed September 25, 1929. Serial No. 394,951.

This invention relates to apparatus for discharging or dumping material such, for example, as cement at a predetermined point or level in a well and more particularly to apparatus for cementing a break or hole in a well casing.

An object of my invention is to provide apparatus for repairing a break or hole in a well casing.

Another object of the invention is to provide apparatus for discharging material such, for example, as cement at any desired point or level in a well.

Still another object of the invention is to provide apparatus for dumping cement at a given point or level in a well casing irrespective of whether that point be at the bottom of the well casing or at some intermediate portion of the well casing.

A further object of the invention is to provide apparatus for forcing material, such for example, as cement into a hole or break in a well casing so as to prevent leakage of material into or out of the casing.

A still further object of my invention is to provide a cement dump of simple and inexpensive design for use in wells and of such construction that it may be lowered into or raised from the well by any suitable cable line.

In accordance with the general features of my invention there is provided a tool for repairing a break or hole in a cement casing which consists of a pair of relatively movable telescoping tubes adapted to be lowered into a well casing, the inner of which is charged with cement which is discharged through an opening in the outer tube into the well casing when the tool reaches the desired point or level in the casing.

Other and further important objects of this invention will be apparent from the disclosures in the specification and the accompanying drawings.

This invention (in a preferred form) is illustrated in the drawings and hereinafter more fully described.

On the drawings:

Figure 1 is an elevation of a cement dump embodying the feature of my invention.

Figure 2 is an enlarged vertical sectional view of the device shown in Figure 1 illustrating how it may be used to lower a charge of cement or other material to a break or hole in a well casing.

Figure 3 is a sectional view similar to Figure 2 illustrating how the cement is discharged from the cement dump into the well to seal and fill the break in the casing.

Figure 4 is a fragmentary enlarged vertical sectional view of my cement dump taken on the line IV—IV of Figure 3 looking in the direction indicated by the arrows.

Figure 5 is an end view partly in section taken on the line V—V of Figure 4 looking upwardly.

Figure 6 is a cross-sectional view taken on substantially the line VI—VI of Figure 4 looking downwardly.

Figure 7 is an enlarged view partly in section taken on the line VII—VII of Figure 3 looking downwardly.

As shown on the drawings:

The reference character 10 designates generally the main tube or body of my cement dump and is of a diameter sufficiently small in size so as to allow it to be lowered down into a well casing 11, as shown in Figures 2 and 3. Telescoping this tube 10 is an interior tube 12 which is of sufficient length to carry the required charge of material or cement 13 as shown in Figure 2. In fact, the tube 12 may comprise a plurality of sections coupled together by means of coupling collars 14. The upper end of the tube 12 is cut away as indicated at 15 in Figure 1 so as to permit of the ready introduction of cement or other material into the tube. This upper end of the tube is also provided with a U-shaped bail or rein 16 which is designed to be fastened to a suitable cable line for lowering the cement dump in the well casing. It will, of course, be evident that this cement dump can be lowered in the well casing by any one of the various cable lines connected to the rigs of a derrick or the like.

The lower end of the tube 12 is slidably disposed within the main tube 10 and is held against rotation in said tube 10 by means of screw pin 17 which extends into the vertical slot 19 formed in the tube 10. This pin 17 is threaded into a metal block 18 secured to the lower end of the tube 12.

Also mounted in the block of metal 18 is a spring urged latching plunger 20. The inner end of this plunger 20 is mounted in a cylindrical recess 21 formed in the block 18 and the outer end of this plunger extends through a hole in the tube 12 and is adapted to project in an opening 22 in the outer tube 10 when the two tubes 10 and 12 are latched together. Endwise movement of the plunger 20 is limited by a screw 23 threaded through the lower end of block 18 into an enlarged recess 24 within the plunger 20. This plunger 20 is at all times urged in an outward direction by means of a compressed spring 25 disposed in the cylindrical hole 21. Obviously, by pushing the plunger 20 further into the cylindrical hole 21 it is possible to disconnect the tube 10 from the tube 12 so as to move the latter relative to the former.

The lower end of the block 18 is provided with a flanged portion 26 adapted to seat upon the upper end of a tubular plug 27 threaded into the lower end of tube 10. As shown in Figure 4, the flange portion 26 of block 18 is seated on the upper end of the tubular plug 27 when the two tubes 10 and 12 are latched together by means of the plunger 20.

The block 18 has a chisel-shaped upper end comprising two converging or downwardly inclined surfaces 31—32 which, as best shown in Figure 6, are directly opposite openings 33 and 34 respectively in the tube 12. The two openings 33—34 are diametrically opposite each other and are adapted to be brought into alignment with openings 35 and 36 respectively formed in the tube 10. That is to say the openings 33 and 34 will be aligned with the openings 35 and 36, respectively, as best shown in Figs. 3 and 6, when the device is discharging cement; or, in other words, when the two tubes 10 and 12 are latched together by the plunger 20.

Threaded into the tubular plug 27 is a closure plug 40 which has a central opening 41 (Fig. 4) through which extends the upper end of a rod 42. This rod 42 is movably mounted in the opening 41 but is held from falling out of the plug 40 by means of a nut 43 threaded upon the extreme upper end of the rod.

The lower end of the rod 42 is provided with a U-shaped anchor member 45 which has its extreme lower portion secured to the lower end of the rod 42 by means of a pair of nuts 46 and 47. The upper ends of the resilient legs of this anchor 45 are bent inwardly toward each other and are each provided with openings 48 and 49 (Fig. 7) through which the rod 42 extends. The opening 48 is an elongated one and is designed to allow the leg of member 45 associated therewith to move outwardly into cooperation with the inner surface of a well casing such as the casing 11 shown in Figure 2. That is to say, due to the resilient nature of the leg of the anchor member 45 carrying the elongated opening 48, this leg will tend to be forced into tight frictional engagement with the inner surface of the well casing and to thereby frictionally anchor the rod 42 thereto.

It will be noted from Figure 4 that the rod 42 is provided with latching element 50 which extends into a recess 52 in the rod 42 and is pivotally attached to the rod by means of a pin 51. The upper end of this latching element 50 is at all times urged outwardly by means of a spring 53 disposed in the recess 52. Obviously, when the rod 42 is in the position shown in Figure 4 the latching element 50 will operate to hold the rod in the position shown and against upward displacement.

The operation of my novel cement dump is briefly as follows. Before the operator can lower the cement dump into the well he must first ascertain the approximate level at which the break or opening in the casing is disposed. He must also ascertain approximately the size of the opening so as to enable him to determine about how much cement will be required. These steps may be performed by lowering a suitable fishing tool in the well casing by which the approximate level of the break or opening in the casing may be determined. That is to say, when the fishing tool reaches the break or opening in the casing the operator can tell how far down the well this break is located by measuring the length of cable lowered into the well.

Then the operator assembles the cement dump with the required number of tube sections 12 to handle the charge of cement to be lowered in the well. The cement is poured into the tube 12 through the recessed portion 15. It is, however, of course to be understood that before the cement can be lowered into this tube 12 the lower portion of tube 12 is raised to its upper position and is held there due to the fact that the cable 49 holds up the tube 12 in the well whereas the tube 10 and the parts connected thereto will tend to gravitate to their lowermost position as shown in Figure 2. Also, when the tube 10 is in this position the rod 42 is manually raised to its uppermost position so that the latch element 50 is disposed above the plug 40.

After the tube 12 has been filled with cement 13, as shown in Figure 2, the cement dump is lowered into the well by means of the cable 49. The operator then exerts an upward pull on the cable line 49 thus raising the two tubes 10 and 12 on the rod 42 and thereby causing the latch 50 to be urged outwardly by the spring 53 into engagement with the underside of the closure plug 40, as shown in Figure 3. The reason the rod 42 does not move upwardly with the tubes 10 and 12 during this raising operation is because of the frictional engagement of the well casing by the anchor 45. Thereafter the tube 12 is again lowered; but this time the tube 10 does not move with the tube 12. That is to say, the tube 12 moves downwardly within the tube 10 from the position shown in Figure 2 to the position shown in Figure 3 at which time the openings 33 and 34 will be aligned with the discharge openings 35 and 36. Then the cement 13 is free to gravitate along the inclined surfaces 31 and 32 of the block 18 into the break 60 in the well casing 11. This cement as shown in Figure 3 not only fills up the break in the casing but also fills up the opening, if any, about the well casing at the break. Thereafter the cement dump can be raised from the well casing by means of the cable line 49.

I also desire it understood that this cement dump of my invention may be used to discharge cement in the bottom of a well casing or well. When the cement dump is to be used for this purpose the rod 42 is detached from the device by removing the nut 43. Then when the cement dump is lowered into a well with a charge of cement, the operator lowers the cement dump until it reaches the bottom of the well at which time the cement may be discharged therefrom by merely allowing the tube 12 to gravitate to its lowermost position as shown in Fig. 3.

Now it is, of course to be understood that although I have illustrated and described in detail the preferred embodiment of my invention, the invention is not to be thus limited but only insofar as defined by the scope and spirit of the appended claims.

I claim as my invention:

1. In a device for depositing a sealing material in a well, a hollow member having a discharge opening, a sleeve on said member having an opening for registration with said discharge opening, a rod mounted on said sleeve, said elements being axially movable relative to each other, a drag shoe carried by said rod for engagement with the wall of the well, a latch for securing said rod and sleeve against relative movement upon the upward pull of said member, means effecting a registration of the openings by lowering said member after the rod and sleeve have been secured together, and a detent for latching the member and sleeve against relative movement when the openings are in registration.

2. In a device for depositing material in a well, a hollow member having a discharge opening, a sleeve associated with said member having an opening for registration with said discharge opening, a rod-like element connected to said sleeve, said member, sleeve, and element being axially movable relative to each other, frictional anchoring means connected to said element for engagement with the wall of the well, means for securing said element and sleeve against relative movement upon said member being pulled upwardly, and means effecting registration of the openings by the lowering of said member after said element and sleeve have been secured together.

3. In a device for depositing material in a well, a hollow member having a discharge opening, a sleeve associated with said member having an opening for registration with said discharge opening, a rod-like element connected to said sleeve, said member, sleeve, and element being axially movable relative to each other, means connected to said element for engagement with the wall of the well, means for securing said element and sleeve against relative movement upon said member being upwardly pulled, means effecting a registration of the openings by lowering said member after said element and sleeve have been secured together and means for securing the sleeve and member against relative movement when the openings are in registration.

In testimony whereof I have hereunto subscribed my name at Tulsa, Tulsa County, Oklahoma.

FRANK J. HINDERLITER.